US008696271B2

(12) United States Patent
Dickey (10) Patent No.: US 8,696,271 B2
(45) Date of Patent: Apr. 15, 2014

(54) FASTENING NUT AND TOOL BIT HOLDING SYSTEM

(76) Inventor: Cory Dickey, Irwindale, CA (US)

(*) Notice: Subject to any disclaimer, the term of this patent is extended or adjusted under 35 U.S.C. 154(b) by 616 days.

(21) Appl. No.: 12/945,632

(22) Filed: Nov. 12, 2010

(65) Prior Publication Data

US 2012/0121354 A1    May 17, 2012

(51) Int. Cl.
*B23B 31/20* (2006.01)
(52) U.S. Cl.
USPC .............................. 409/132; 408/67; 409/137
(58) Field of Classification Search
USPC .................... 408/1 R, 67; 409/137, 131–132
See application file for complete search history.

(56) References Cited

U.S. PATENT DOCUMENTS

| | | | | |
|---|---|---|---|---|
| 1,635,769 | A * | 7/1927 | Royle | 416/237 |
| 2,006,108 | A * | 6/1935 | Montuori | 451/453 |
| 2,377,271 | A * | 5/1945 | Schumann | 464/17 |
| 2,387,412 | A * | 10/1945 | Schnable | 409/135 |
| 2,482,620 | A * | 9/1949 | Huck | 409/172 |
| 3,167,260 | A * | 1/1965 | Gibbons et al. | 241/56 |
| 5,772,367 | A * | 6/1998 | Daniel | 408/67 |
| 5,941,664 | A * | 8/1999 | Morsch | 409/131 |
| 5,980,525 | A * | 11/1999 | Bryant et al. | 606/80 |
| 6,146,066 | A * | 11/2000 | Yelton | 409/134 |
| 7,334,971 | B2 * | 2/2008 | Benedetti et al. | 409/137 |
| 2003/0041713 | A1 * | 3/2003 | Kress et al. | 83/100 |
| 2009/0060667 | A1 * | 3/2009 | Colleluori | 408/56 |

FOREIGN PATENT DOCUMENTS

| | | | | |
|---|---|---|---|---|
| DE | 2551537 | A | * | 5/1977 |
| DE | 10230590 | A1 | * | 1/2003 |
| DE | 102007030858 | A1 | * | 2/2008 |
| EP | 1872901 | A1 | * | 1/2008 |
| GB | 2333478 | A | * | 7/1999 |
| JP | 63144931 | A | * | 6/1988 |
| JP | 05309544 | A | * | 11/1993 |
| JP | 07276120 | A | * | 10/1995 |
| JP | 09285939 | A | * | 11/1997 |
| WO | 2007113140 | | | 10/2007 |

OTHER PUBLICATIONS

EPO website translation of DE 10230590, printed Jun. 2013.*
EPO website translation of DE 102007030858, printed Jun. 2013.*
Aerotech System Brochure, Revised May 2008.
Aerotech website: http://www.dustfreenesting.com, last accessed Oct. 21, 2011.

* cited by examiner

*Primary Examiner* — Daniel Howell
(74) *Attorney, Agent, or Firm* — Gates & Cooper LLP (57) ABSTRACT

A fastening nut for fastening a receiving body and a collet together is disclosed. The fastening nut comprises a main body having an outer surface, a first end, and a second end distal to the first end and a plurality of blades located radially on the outer surface of the main body, wherein each blade is at an angle to the second end. The fastening nut is attachable on the receiving body for coaxial retention of the collet. Furthermore, axial rotation of the fastening nut creates a suction proximate the second end of the fastening nut. In one embodiment of the fastening nut, the plurality of blades protrude axially past the second end of the main body in a direction away from the first end. A tool bit holding system and a system and method for machining specimens comprising the fastening nut are also disclosed.

14 Claims, 8 Drawing Sheets

FASTENING NUT AND TOOL BIT HOLDING SYSTEM

BACKGROUND OF THE INVENTION

1. Field of the Invention

This invention relates to fastening and clamping nuts used in collet chuck systems to fasten a collet to a receiving body. This invention also relates to tool bit holding systems and methods of cutting a specimen.

2. Background

Rotary-type working tools are commonly used in machining and material-working processes, such as turning, boring, drilling, milling, broaching, and grinding. Depending on the desired material-working process, different types of rotary tool bits and work pieces, such as drill bits, broaches, and sanding heads, are used with the rotary-type working tools. Often, it is desirable for the working tools to be able to utilize removable tool bits and work pieces so that differently sized or shaped tools may be used on a single machine. Different types of tool bit holders or chucks, such as drill chucks and independent jaw chucks, are available to hold such removable tool bits and work pieces.

A collet chuck is a type of chuck commonly found on milling machines, lathes, wood routers, and precision grinders. The collet chuck is generally characterized by a collet disposed within an end portion of a tool shaft or motorized spindle of a working tool and held in place by a fastening nut or collet nut. The collet has a plurality of longitudinally extending jaws arranged equidistant angularly around the circumference of the collet and spaced apart by a plurality of longitudinally extending cuts. As the fastening nut is threaded onto the end portion of the tool shaft or spindle, the inner surfaces of the tool shaft or spindle compresses the jaws of the collet. Compression of the jaws creates a strong clamping force that is used to clamp onto the shank of a work piece or tool bit and securely hold the tool bit or work piece to the working tool.

Collet chucks are widely used in the wood, metal, and plastic working industries. In addition to the working tools and machines, vacuums and other suction means are also often present to remove dust and residues created while cutting or machining specimens. There are many advantages in preventing excessive dust and residue build-up at the site of the cut. Excessive dust and residue build-up creates extra friction on the rotating tool bit, which decreases the tool life and increases undesired heat generation. Additional post-cutting debris removal operations are also required, where operators manually remove the generated debris and waste materials from the specimen through air ejection or vacuum means. This extra post-working process results in reduced production throughput and wasted time, labor, and money.

There are known systems that address the issue of dust and residue removal. In one system, an air/fluid ejecting tube is attached to the machine operating head to blast away dust and debris at the site of machining However, such a system increases the amount of dust and debris in the air and surrounding areas, which becomes a health hazard to operators and negatively influences the operability of the equipment. Furthermore, the system requires additional air/fluid ejecting equipment that must be adapted and attached to the working tool. In another system, an air suction tube is attached to the machine operating head to vacuum the dust and debris at the site of machining However, such a system is operationally inefficient and does not completely remove the generated debris and waste. In another system, Colleluori (International Application Number PCT/EP2007/052809), hereby incorporated by reference herein, discloses a cutting or etching device with an impeller keyed onto the tool that removes fine and powdery wastes with suction created from rotation of the tool. However, the device requires specifically manufactured tools with a keyed or integrated impeller. Furthermore, the specifically manufactured tools cannot accept the various existing tool bits and working pieces already in use by other working tools and machines. Therefore adaptation of the device requires a significant financial investment for an operator already with currently operating working tools and machines. Additionally, the number of specifically manufactured tool bits for the device is limited and significantly less in comparison to the general assortment of available industry standard-sized tool bits and working pieces. Thus it is likely that in adapting the device, operators will not able to use the tool bits and working pieces that they are more familiar with or prefer.

Furthermore, the above described systems rely on the operator and/or pre-set parameters in a computer controller to limit the degree of cutting/machining on an article. However, in unexpected situations, such as instances resulting from operator oversight or an erroneous parameter input, there is no last-minute safety mechanism that prevents damage to the working tool when the tool is forced too aggressively onto an article. Cutting or machining an article too aggressively may result in the tool shaft or motorized spindle contacting the article and being abruptly stopped from an extremely high-speed rotation, thereby causing significant damage to the working tool or machine.

Therefore, there is a need for a working tool/machining system with efficient dust and residue removal capabilities. There is also a need for a cost-effective dust and residue removal apparatus that can be adapted to existing working tool systems, wherein a minimal amount of additional equipment is required for such dust and residue removal capabilities. Furthermore, there is a need for a tool bit holding system with dust and residue removal capabilities that can be attached to existing working tools and machines and that can further utilize existing tool bits and working pieces, in order to minimize adaptation costs and maximize the operability and functionality of the working tools and machines currently existing in the market. Additionally, there is a need for a system and apparatus that provides a safety mechanism which prevents damage to the working tool when the tool is forced too aggressively onto an article.

SUMMARY OF THE INVENTION

To overcome the limitations in the prior art described above, and to overcome other limitations that will become apparent upon reading and understanding the present disclosure, the present invention discloses embodiments of a fastening nut, tool bit holding system, system for machining specimens, and method for cutting a specimen.

In one aspect of the present invention, a fastening nut for fastening a receiving body and a collet together is disclosed. The fastening nut comprises a main body having an outer surface, a first end, and a second end distal to the first end. The fastening nut further comprises a plurality of blades located radially on the outer surface of the main body, wherein each blade is at an angle to the second end. The fastening nut is attachable on the receiving body for coaxial retention of the collet. Furthermore, axial rotation of the fastening nut creates a suction proximate the second end of the fastening nut. In one embodiment of the fastening nut, the plurality of blades protrude axially past the second end of the main body in a direction away from the first end.

In another aspect of the present invention, a tool bit holding system is disclosed. The tool bit holding system comprises a collet with a longitudinal cavity for engaging with a tool bit, a receiving body having a recess for receiving the collet, and a fastening nut for fastening the receiving body and the collet together. The fastening nut comprises a main body having an outer surface, a first end, and a second end distal to the first end. The fastening nut further comprises a plurality of blades located radially on the outer surface of the main body, wherein each blade is at an angle to the second end. The fastening nut is removably attached on the receiving body and coaxially retains the collet within the recess of the receiving body. Furthermore, axial rotation of the tool bit holding system creates a suction proximate the second end of the fastening nut. In one embodiment of the tool bit holding system, the plurality of blades protrude axially past the second end of the main body of the fastening nut in a direction away from the first end.

In another aspect of the present invention, a system for machining a specimen is disclosed. The machining system comprises a motor, a rotary spindle driven by the motor, a tool bit holding system attached to the spindle, and a tool bit held by a tool bit holding system. The tool bit holding system comprises a collet with a longitudinal cavity for engaging with a tool bit, a receiving body having a recess for receiving the collet, and a fastening nut for fastening the receiving body and the collet together. The fastening nut comprises a main body having an outer surface, a first end, and a second end distal to the first end. The fastening nut further comprises a plurality of blades located radially on the outer surface of the main body, wherein each blade is at an angle to the second end. The fastening nut is removably attached on the receiving body and coaxially retains the collet within the recess of the receiving body. Furthermore, axial rotation of the tool bit holding system creates a suction proximate the second end of the fastening nut. In one embodiment of the machining system, the plurality of blades protrude axially past the second end of the main body of the fastening nut in a direction away from the first end.

In another aspect of the present invention, a method of cutting a specimen is disclosed. The method comprises the steps of: providing a collet chuck system; attaching a tool bit to the collet chuck system; rotating the collet chuck system and attached tool bit; and cutting the specimen with the rotating tool bit while removing debris created from cutting the specimen with a suction created by the rotation of the fastening nut. The collet chuck system comprises a collet with a longitudinal cavity for engaging with a tool bit, a receiving body having a recess for receiving the collet, and a fastening nut for fastening the receiving body and the collet together. The fastening nut comprises a main body having an outer surface, a first end, and a second end distal to the first end. The fastening nut further comprises a plurality of blades located radially on the outer surface of the main body, wherein each blade is at an angle to the second end. The tool bit is attached to the collet chuck system by clamping the tool bit in the longitudinal cavity of the collet and axially retaining the collet between the fastening nut and receiving body. In one embodiment of the method, the plurality of blades protrude axially past the second end of the main body in a direction away from the first end.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to a specific embodiment in which the invention may be practiced. It is to be understood that other embodiments may be utilized and structural changes may be made without departing from the scope of the present invention.

Fastening Nut Apparatus

In one aspect of the present disclosure, a fastening nut for fastening a receiving body and a collet together is disclosed. The fastening nut, also known as a clamping nut or collet nut, comprises a main body and a plurality of blades located radially on the outer surface of the main body. The fastening nut is attachable on the receiving body for coaxial retention of the collet. Axial rotation of the fastening nut rotates the plurality of blades which subsequently create suction proximate the second end of the fastening nut. The created suction or vacuum can be used to remove small, fine or powdery articles located near the plurality of blades and/or second end of the fastening nut. In particular, the suction can be used to remove dust, debris, and other waste residue created during the working or machining of articles and specimens.

Typically, due to considerations regarding operator safety, the fastening nut is used on a computer numerical controlled (CNC) machine. However, the fastening nut can also be used on any other rotary-type working tool, including hand-operated tools and other automated machines. Furthermore, the fastening nut may be manufactured to attach to existing working tools and tool bit holding systems by replacing the fastening/collet/clamping nut on the existing working tool or tool bit system. In one embodiment, the fastening nut includes inner surface threading with compatible parameters as the inner surface threading of the collet nut on an existing working tool. Preferably, the fastening nut is made of a strong material, such as tooling steel, alloy steel, carbon steel, titanium, and other metals and alloys, which can withstand high velocity rotation and securely retain the collet between the fastening nut and the receiving body of the working tool or machine.

FIGS. 1A, 1B, 2, and 3 depict different perspective views of one embodiment of the fastening nut. A main body 110 of a fastening nut 100 has an outer surface 120, a first end 140, and a second end 160 distal to the first end 140. A plurality of blades 180 is located radially on the outer surface 120 of the main body 110. In one embodiment, the fastening nut comprises six blades, each blade 180 at a 45 degree angle to the second end 160. In a second embodiment, the fastening nut 100 has a diameter of approximately 4 ⅓ inches. Furthermore, the blades 180 protrude axially past the second end 160 of the main body 110 in a direction away from the first end 140.

Figure 2:
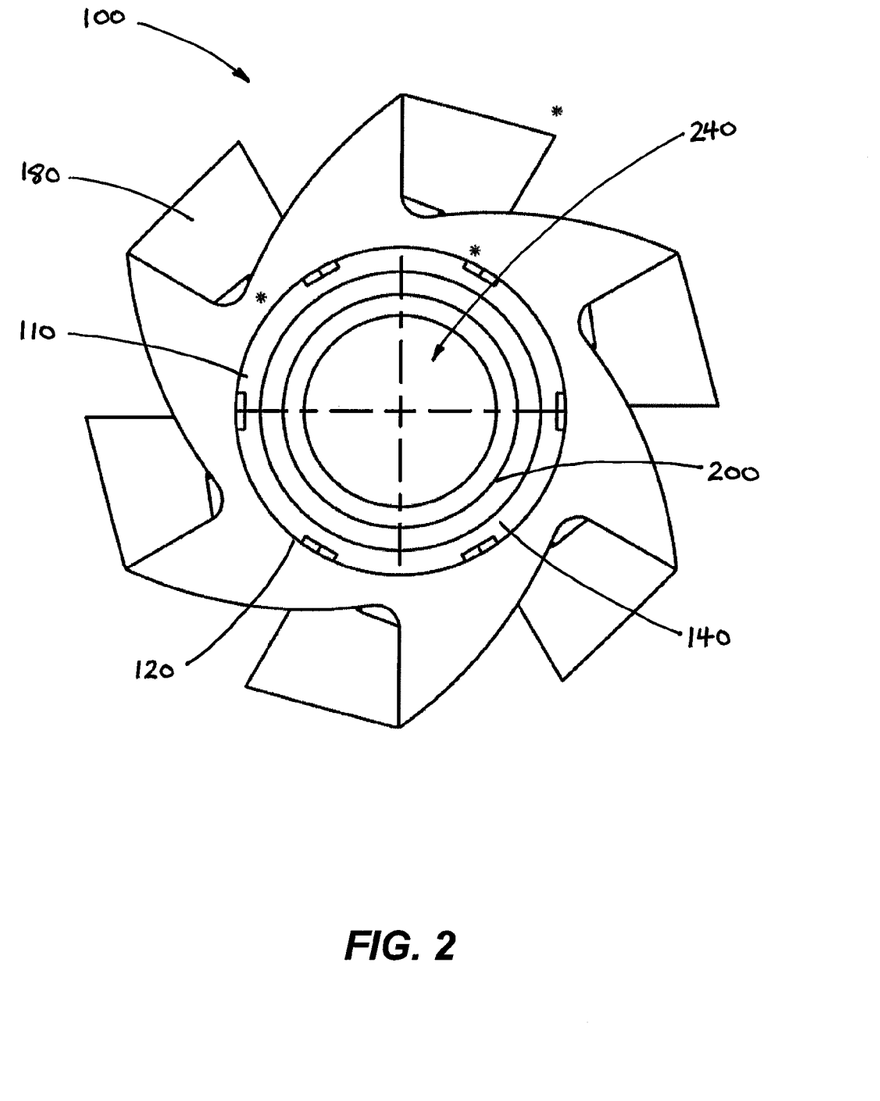
FIG. 2 is a top view of the embodiment of a fastening nut.
Figure 3:
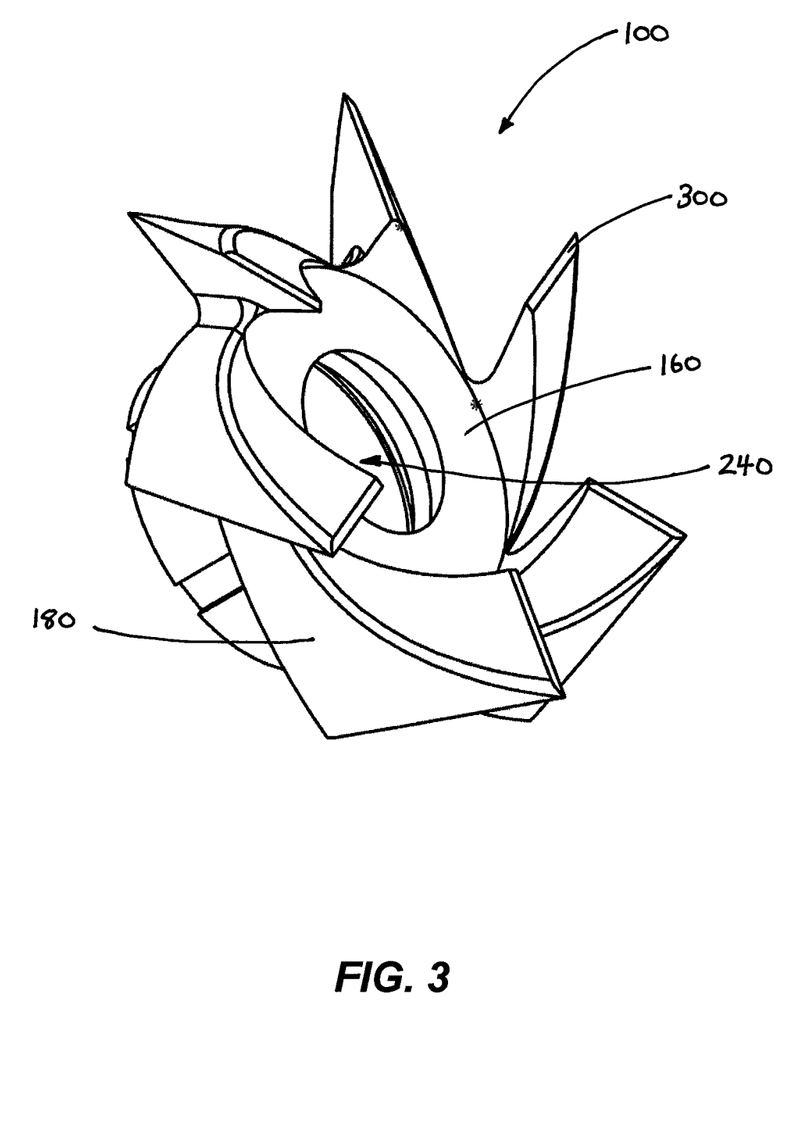
FIG. 3 is a perspective view of the embodiment of a fastening nut.

In one aspect of the invention, the fastening nut 100 comprises a main body 110 characterized by a first end 140, a second end 160 distal to the first end 140, and an outer surface 120. The first end 140 attaches onto the receiving body of the working tool or machine. The second end 160 faces towards the specimen or article machined. The main body 110 can be any shape, such as cylindrical, hexagonal, and rectangular shapes. In one embodiment, as shown in FIGS. 2 and 3, the main body 110 of fastening nut 100 is a cylindrical body with an outer circumferential surface. In a further embodiment, the main body has a diameter of approximately 2¼ inches. In another embodiment, the main body 110 is a hexagonal shape, which allows the usage of a wrench or spanner to tightly screw the fastening nut onto the receiving body.

The main body 110 of the fastening nut 100 is removably attachable to the receiving body of a working tool or machine for coaxial retention of a collet between the fastening nut and receiving body. In one embodiment, as shown in FIG. 2, the main body 110 has a hollow threaded inner circumference 200 that is sized to engage with a threaded outer circumference of the receiving body. In another embodiment, the main body 110 has a threaded outer circumference that is sized to engage with a threaded inner circumference of the receiving body. The main body 110 can also be securely attached to the receiving body through other clamping or fastening methods, for example with separate screws threading through the outer parameters of the main body and receiving body.

In another aspect of the invention, the fastening nut 100 comprises a plurality of blades 180 that are located radially on the outer surface 120 of the main body 110. The number of blades, the size and shape of the blades, and the angle or pitch of the blades all influence the characteristics of the suction/vacuum or air movement created when the fastening nut is rotated. It is also possible to have blades in different numbers, sizes, shapes and/or angles achieving the same performance. Ideally, the blades 180 on the fastening nut 100 are of equal size, shape, and spaced angularly equidistant on the outer surface 120 of the main body 110 so that balanced rotation is achieved when the fastening nut 100 is rotated.

Any number of blades 180, for example 2, 3, 4, 5, 6 or 8 blades, can be used on the fastening nut. A single screw-shaped blade encircling an outer circumferential surface of the main body 110 can also be used. In one preferred embodiment, as shown in FIGS. 1A, 1B, 2 and 3, six blades are used.

Figure 1A:
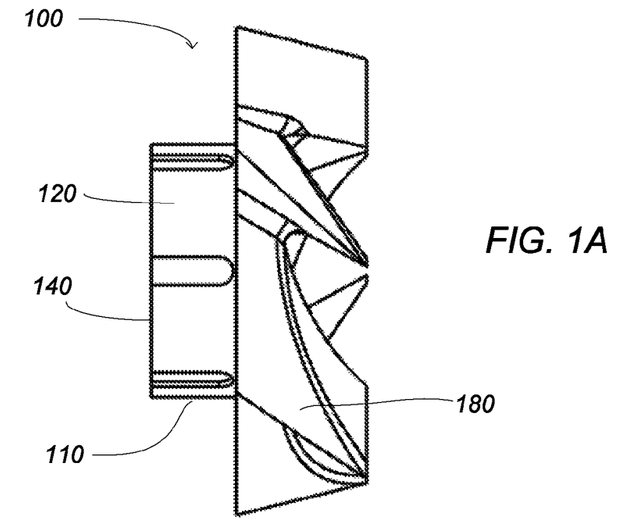
FIGS. 1A and 1B are side views of an embodiment of a fastening nut.
Figure 1B:
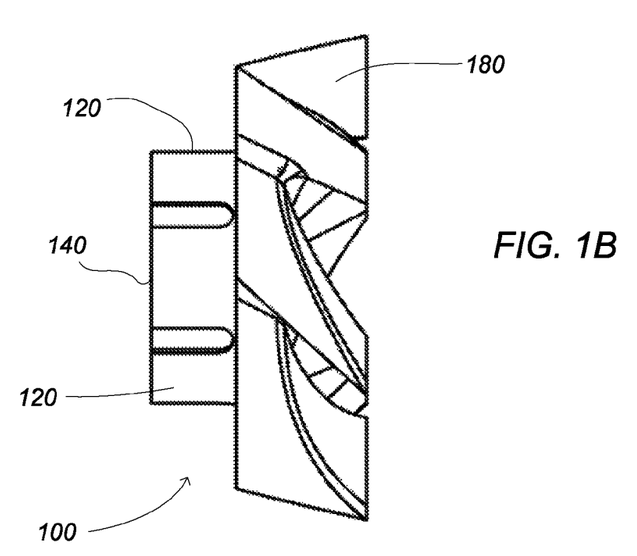

The blade 180 can be of any shape, including planar, curved, twisted, and wedge shaped. In one preferred embodiment, as shown in FIGS. 1A 1B and 3, the plurality of blades 180 are wedge shaped with a slightly concave surface contour. As shown in FIG. 3, the shape of the blade 180 may also include beveling/beveled edge 300, which helps the blade 180 cut through the air while the fastening nut 100 is rotating. Furthermore, the blade 180 can be of any size, which includes the width of the blade extending radially from the outer surface 120 of the main body 110 and the length of the blade extending longitudinally on the outer surface 120 of the main body 110. Larger blades may create greater suctioning and air movement, but are more inconvenient in terms of the space required and their impact on the rotation of the tool. In one embodiment, the blade 180 has a length of approximately 1 inch.

The angle or pitch of the blades 180 can be at any angle, ranging from 90 degrees (parallel longitudinally to the axis of rotation) to an angle slightly greater than 0 degrees (perpendicular longitudinally to the axis of rotation). Various factors may influence the desired angle of attack of the blades 180, such as the desired amount of suction or tool rotation speed and the size of the debris or articles that pass between the blades as they are removed by suction. Tilting the blades 180 at a greater angle may create greater suction but would require more energy to rotate. Larger blade angles may also be needed to prevent larger debris or articles from getting stuck between the blades. In one preferred embodiment, the blades 180 are all tiled at a 45 degree angle to the second end 160. In some embodiments, the blades 180 are machined at a fixed angle on the main body 110 of the fastening nut. In other embodiments, the angles of the blades 180 are adjustable, depending on the current machining process.

In one embodiment of the invention, the blades protrude axially past the second end of the main body of the fastening nut in a direction away from the first end. As shown in FIGS. 1A, 1B and 3, blades 180 protrude past the second end 160 of the main body 110 in a direction away from the first end 140. In one embodiment, the blades 180 protrude approximately 1 inch past the second end 160 of the main body 110. Protrusion of the blades 180 provides a safety mechanism against damaging the working tool or machine if the rotating fastening nut contacts the article or specimen machined. Generally, during the machining or cutting process, only the rotating tool bit or work piece contacts the article or specimen. However, sometimes accidentally through operator mistake or machine calibration error, the rotating tool bit or work piece is forced too aggressively onto the article or specimen. If the article or specimen contacts the main body 110 of the fastening nut 100 and forcibly stops the fastening nut during its high speed rotation, serious damage to the working tool or machine itself may occur. Instead, protrusion of the blades 180 acts as a safety barrier, cutting into the article or specimen first, which alerts the operator of an error and prevents damage to the working tool or machine. In some embodiments, the blades 180 are beveled to further facilitate the blades in cutting into the article or specimen, which is relatively cheaper and easier to replace than fixing a damaged working tool or machine.

In another aspect of the invention, axial rotation of the fastening nut 100 creates a suction or vacuum proximate the second end 160 of the fastening nut 100. The fastening nut is attached to the working tool or spindle and thus rotates at the same speed as the spindle. In one embodiment, the fastening nut 100 rotates at a speed of 18,000+/−6000 RPM. Depending on the angle of the blades 180, the fastening nut 100 may create suction through either a clockwise or counter-clockwise rotation. The suction created by the rotation of the fastening nut 100 is used to remove dust, debris, and other waste residues at the area of working or machining of the article or specimen. In one embodiment, the suction created directly at the site of cutting relieves the small debris and dust that come off of the cut to provide a much cleaner and efficient cutting area. In some embodiments, the fastening nut 100 increases the life of a tool bit by eliminating the extra friction and subsequent heat generation on the rotating tool bit that are caused by dust and residue.

Tool Bit Holding System

In second aspect of the present disclosure, a tool bit or working piece holding system is disclosed. In one embodiment, the tool bit holding system is a collet chuck system comprising a collet with a longitudinal cavity for engaging with a tool bit, a receiving body having a recess for receiving the collet, and the fastening nut described herein for fastening the receiving body and collet together.

The tool bit holding system can be used in any machining and material-working process that requires a rotary-type working tool, such as drilling, milling, tapping, reaming, boring, coolant through, and grinding. The tool bit holding system can also be integrated or removably attached to the rotary-type working tool. Preferably, the tool bit holding system is made of a strong material, such as alloy steel, carbon steel, titanium, and other metals and alloys, which can withstand high velocity rotation and securely hold onto a tool bit or working piece. Furthermore, different elements of the tool holding system can be made of different materials depending on their functions (e.g. the receiving body may be made of tool steel, the collet may be made of spring steel, and the fastening nut may be made of tool steel). The recess of the receiving body and the longitudinal cavity of the collet are sized to accommodate the desired collet and tool bit, respectively. In various embodiments, the tool bit holding system accepts tools bit and shanks of working pieces ranging from 1/64 to 1 inch.

Figure 4:
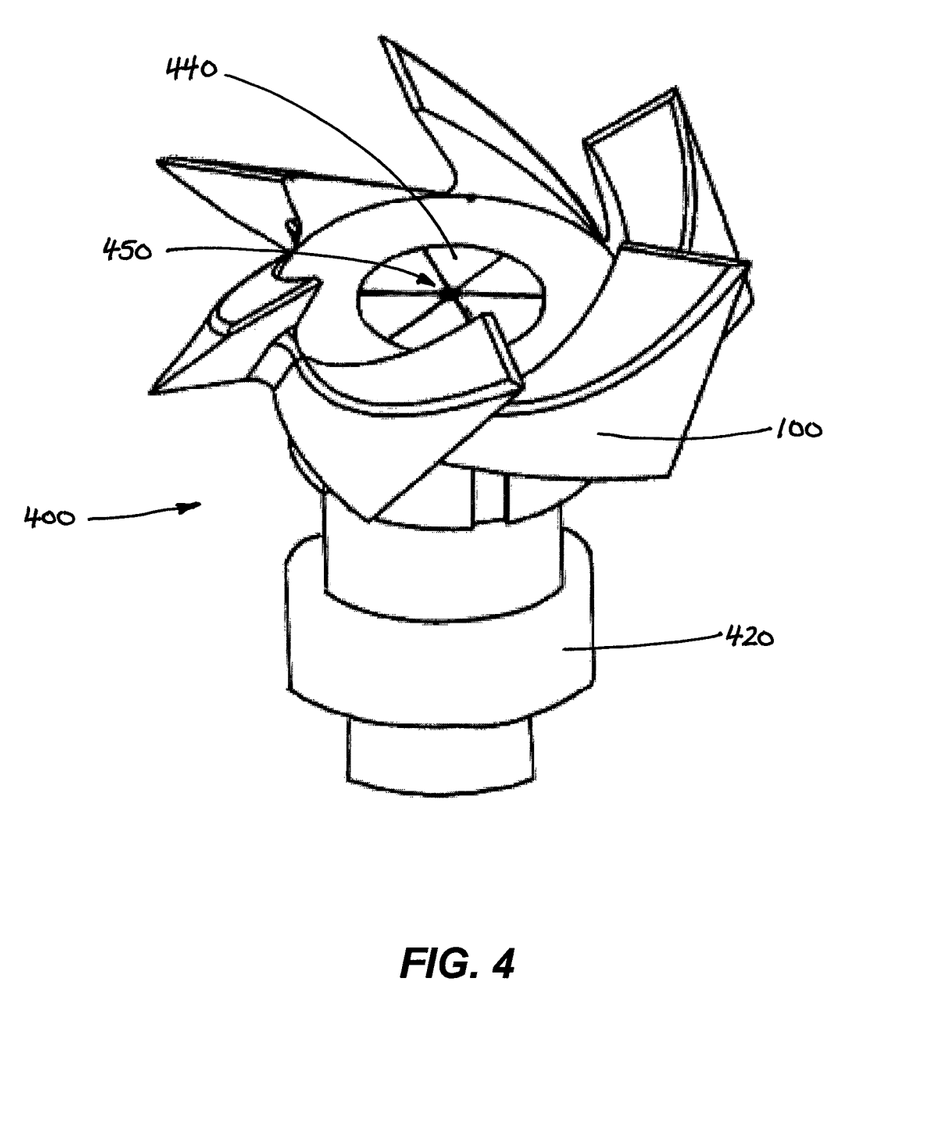
FIG. 4 is a perspective view of an embodiment of a tool bit holding system.

FIG. 4 shows a perspective view of one embodiment of the tool bit holding system. The tool bit holding system 400 comprises a collet 440 with a cavity 450 disposed within a receiving body 420. The fastening nut 100 described herein is attached to the receiving body 420, thereby retaining the collet 440 between itself and the receiving body 420.

Figure 5:
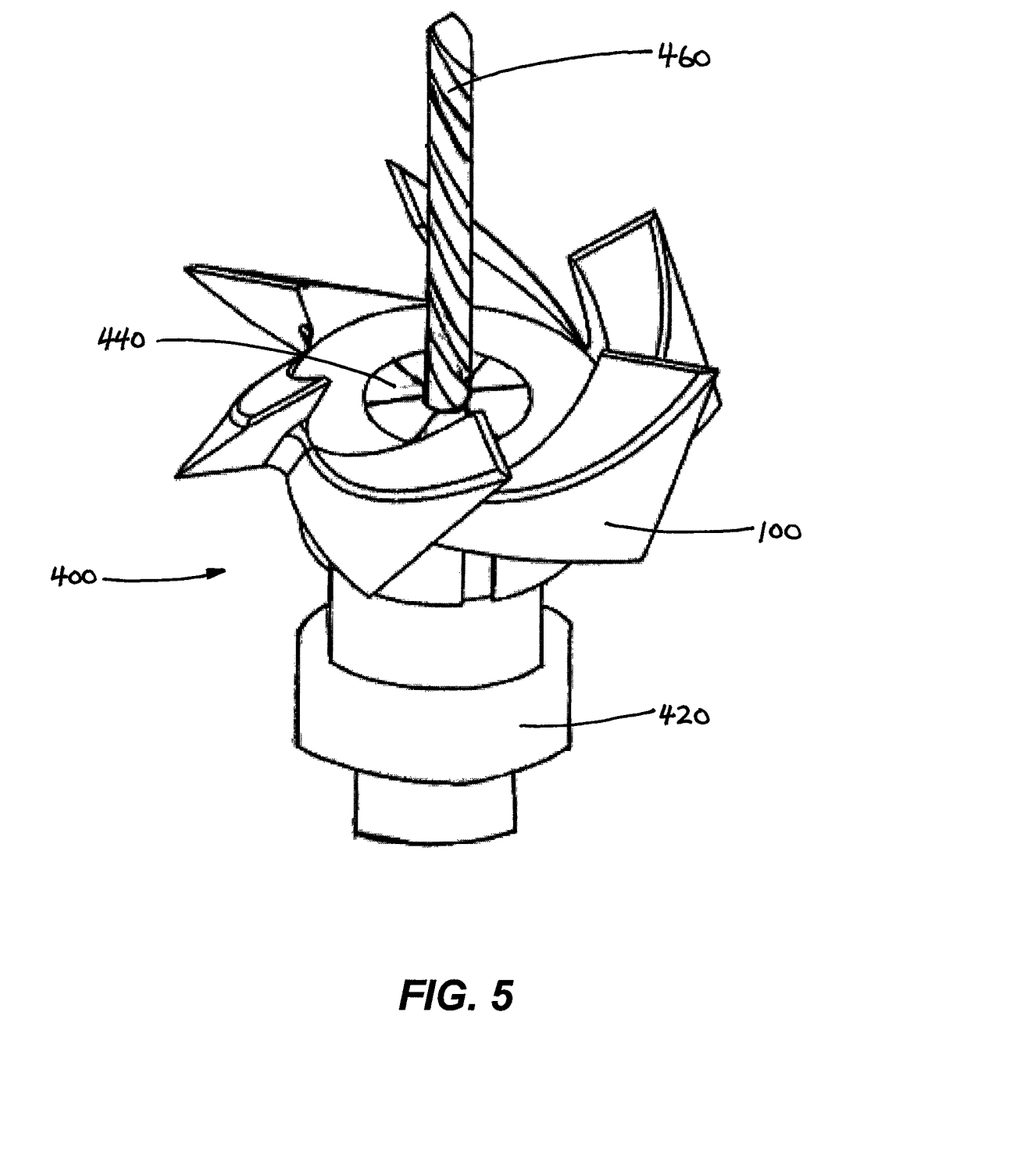
FIG. 5 is a perspective view of the embodiment of a tool bit holding system with a tool bit attached.

FIG. 5 shows a similar perspective view of tool bit holding system 400 with a tool bit 460 attached. Tool bit 460 protrudes outside one end of the tool bit holding system 400 through the center opening 240 of fastening nut 100 and is held in place via the clamping of collet 440. Blades 180 of fastening nut 100 protrude axially past the second end 160 of the fastening nut 100 in the same direction as tool bit 460.

Figure 6:
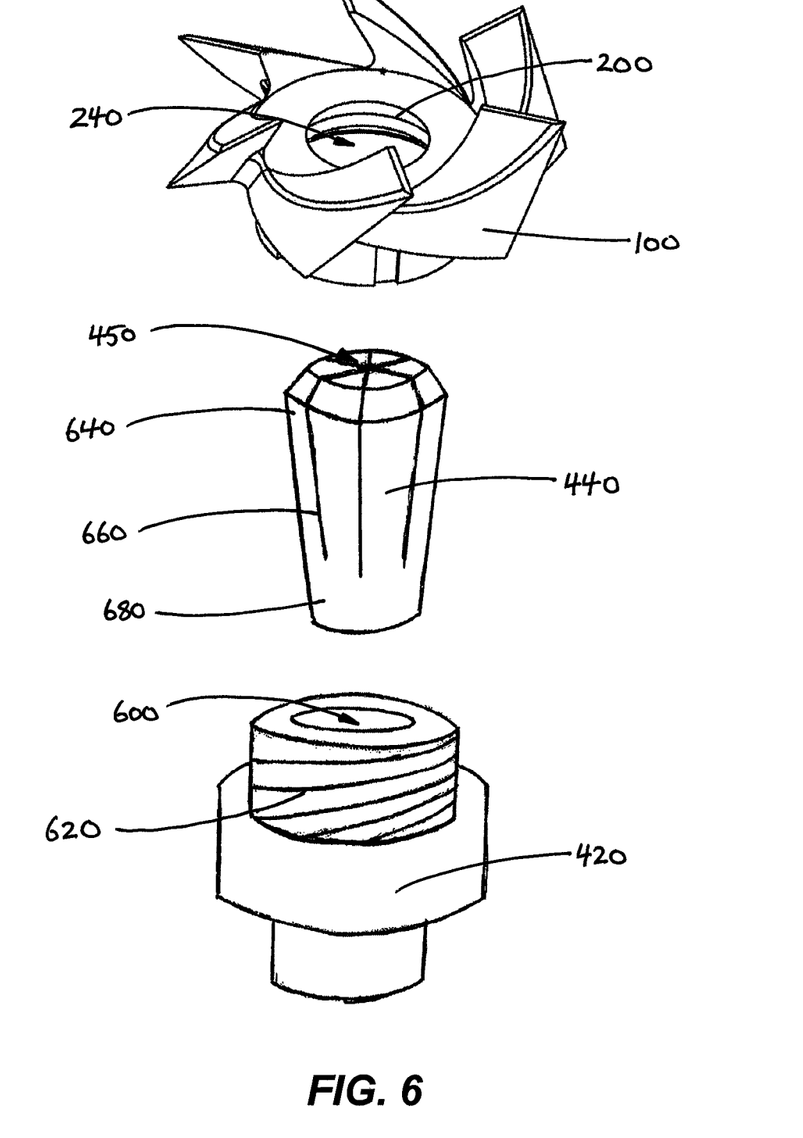
FIG. 6 is an exploded perspective view of the embodiment of a tool bit holding system.

FIG. 6 shows an exploded view of the tool bit holding system, including the receiving body 420 with recess 600, collet 440 with longitudinal cavity 450, and fastening nut 100 with center opening 240.

In one aspect of the invention, the tool bit holding system 400 comprises a receiving body 420 or sleeve with a recess 600 for accepting a collet 440. In some embodiments, the receiving body 420 is a section of the end of a working tool or machine, such as a shaft, spindle or arbor. In other embodiments, as shown in FIGS. 4-6, the receiving body 420 is a separate piece that can be removably attached to the ends of different working tools or machines. The receiving body 420 is preferably made of a strong material, such as tempered steel, alloy steel, carbon steel, titanium, and other metals and alloys, which can withstand the high expansive pressures from a tightened collet 440 pushing against the inner recess surface of the receiving body 420. The receiving body 420 is also accordingly shaped to allow for the attachment of the fastening nut 100 as disclosed herein. In one embodiment, as shown in FIG. 6, the receiving body 420 includes a threaded outer circumference 620 that is sized to engage with a threaded inner circumference 200 of the fastening nut 100, thus allowing the fastening nut 100 to be screwed onto the receiving body 420. In another embodiment, the receiving body 420 has a hollow threaded inner circumference that is sized to engage with a threaded outer circumference of a collet 440, thus allowing the collet 440 to be screwed into the receiving body.

In another aspect of the invention, the tool bit holding system 400 comprises a collet 440. At one end of the collet 440, as shown in FIG. 6, a plurality of jaw portions 640 are arranged angularly equidistant around the circumference of collet 440. These jaw portions 640 are equiangularly spaced apart by a plurality of longitudinally extending cuts 660. At the center of the collet 440, between the plurality of jaw portions, is a longitudinal cavity 450 for accepting a tool bit 460 or shank of a work piece. As the collet 440 advances towards the receiving body 420, the spacing between the jaw portions 640 decreases, thereby decreasing the diameter of the longitudinal cavity 450. As the collet 440 retracts from the receiving body 420, the spacing between the jaw portions 640 expands, thereby expanding the diameter of the longitudinal cavity 450. Through the contraction or expansion of spacing between the plurality of jaw portions 640, the collet 440 is able to respectively clamp onto or loosen its grip on a tool bit 460 or shank of the work piece. The adjustability of the size of the longitudinal cavity 450 also allows the collet 440 to accommodate tool bits and shanks of various diameters. As shown in FIG. 6, the plurality of jaw portions 640 are integral with a base portion 680 disposed at the other end of the collet 440. In one embodiment, the plurality of jaw portions 640 and/or the base portion 680 provide a tapered or conical outer surface to the collet 440 that allows for a gradual variation in spacing between the jaw portions 640.

The collet 440 can have any plurality of jaw portions 640, such as 3, 4, 6, and 8 jaw portions. Though the collet 440 typically grips a round shank or shaft of a working tool or drill bit, the longitudinal cavity 450 of the collet 440 can be shaped to accommodate other shapes. Typically, the outer shape of the collet 440 is circular, though the collet 440 can be any shape, such a hexagonal which allows the collet 440 to be tightened or loosened to the receiving body 420 with a wrench. In some embodiments, the collet 440 is a separate piece that is inserted into the recess 600 of the receiving body 420. In other embodiments, the collet 440 is machined into the end of a working tool or machine output element, such as a shaft, spindle or arbor, and thereby eliminating the need for a receiving body 420.

In another aspect of the invention, the tool bit holding system 400 comprises the fastening nut 100 described herein. As shown in FIGS. 4-6, the fastening nut 100 is installed over the collet 440 and attached to the receiving body 420. In one embodiment, the fastening nut 100 is threaded onto the receiving body 420. Fastening/tightening the fastening nut 100 down on the receiving body 420 causes the inner surfaces of the fastening nut 100 and/or receiving body 420 to compress the jaw portions 640 of the collet 440. This clamps the jaw portions 640 around the tool bit 460 or work piece shank and secures the tool bit 460 or work piece to the working tool. When changing tool bits 460 or work pieces, the fastening nut 100 is loosened to allow the collet 440 to expand and release its grip on the tool bit 460 or shank. The tightening and loosening of the fastening nut 100 may be partially performed by hand, but in some embodiments, the size and shape of the fastening nut 100 makes it difficult and/or uncomfortable to properly tighten and loosen the collet 440 nut using hands alone. Therefore, typically, a hand wrench or similar tool is used to apply sufficient torque to the fastening nut 100.

In one embodiment of the invention, blades 180 on the tool bit holding system 400 protrude axially past the second end 160 of the main body 110 of the fastening nut in a direction away from the first end 140. As shown in FIG. 5, blades 180 protrude past the second end 160 of the fastening nut 100 in a direction away from the receiving body 420 and towards the tool bit 460. The protrusion of the blades 180 act as a safety barrier if the rotating tool bit 460 or work piece is forced too aggressively onto the article or specimen to be machined. In such instances, the blades 180 cut into the article or specimen first rather than having the whole rotating portion of the working tool or machine forcibly stopped during high speed rotation. In some embodiments, the blades 180 include a beveled edge that may be used to further facilitate the blades 180 in cutting into the article or specimen, which is relatively cheaper and easier to replace than fixing a damaged working tool or machine.

In another aspect of the invention, axial rotation of the tool bit holding system 400 creates a suction or vacuum proximate the second end 160 of the fastening nut 100 and point of contact between the working tool and specimen to be machined. In one embodiment, the tool bit holding system 400 rotates at a speed of 18,000+/−6000 RPM. The suction created by the rotation of the tool bit holding system 400 removes dust, debris, and other waste residues at the area of working or machining of the article or specimen. In one embodiment, the suction created directly at the site of cutting relieves the small debris and dust that come off of the cut to provide a much cleaner and efficient cutting area. In some embodiments, the tool bit holding system 400 increases the life of a tool bit by eliminating the extra friction and subsequent heat generation on the rotation tool bit 460 that are caused by dust and residue.

System for Machining a Specimen

In a third aspect of the present disclosure, a system for machining a specimen is disclosed. In one embodiment, the machining system comprises a motor, a rotary spindle driven by the motor, the tool bit holding system described herein attached to the spindle, and a tool bit held by the tool bit holding system. Depending on the attached tool bit, embodiments of the machining system perform rotary-type working processes, which include routing, drilling, milling, reaming, and grinding. In a one embodiment, the machining system is a computer numerical controlled (CNC) machine.

Figure 7:
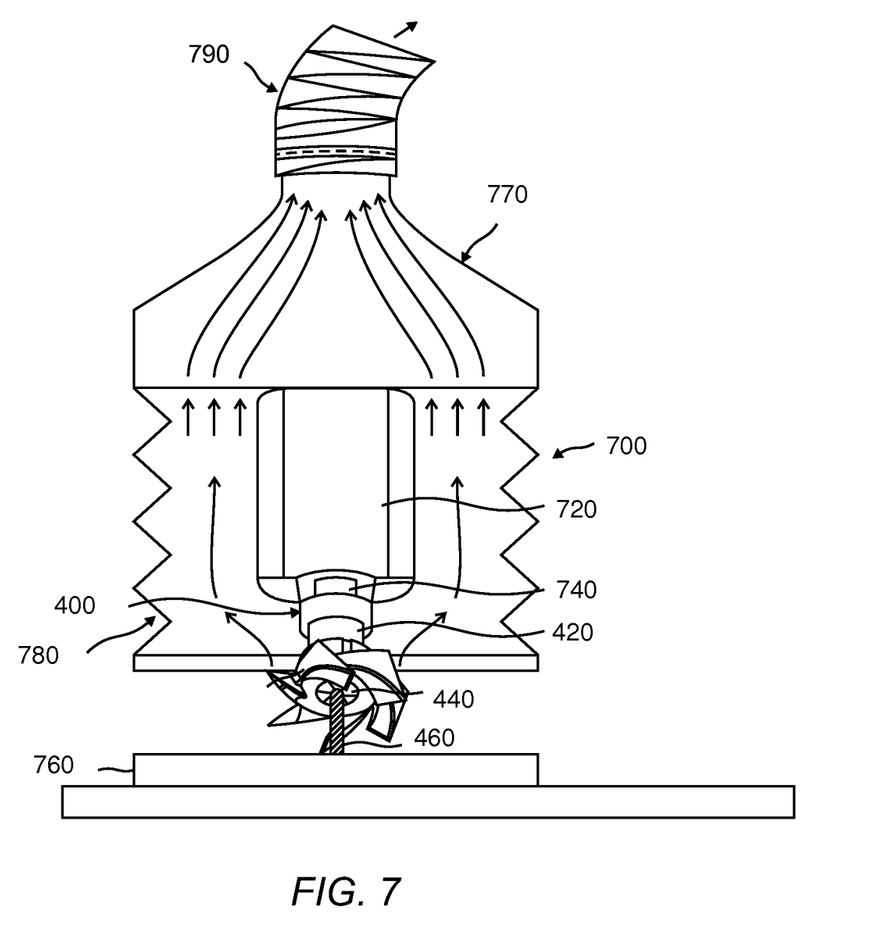
FIG. 7 is a front view of an embodiment of a system for machining a specimen.

FIG. 7 shows a front view of an embodiment of the system for machining a specimen. Machining system 700 comprises a motor 720 and a rotary spindle 740 connected to motor 720. Tool bit holding system 400 comprises a receiving body 420, collet 440, and fastening nut 100. Tool bit 460 is held by tool bit holding system 400 and is used to drill into a work piece/specimen 760 lying on top of a machine table. A dust hood or manifold 770 having a flexible dust curtain 780 is attached to a flexible hose 790 that provides a vacuum air flow. The flexible dust curtain 780 surrounds the motor 720 and tool bit holding system 400 and facilitates the removal of any dust and debris in the air and surrounding area.

In one embodiment of the invention, the machining system 700 comprises blades 180 on the end of the tool bit holding system 400 that protrude axially past the main body 110 of the fastening nut 100 in a direction away from the spindle 740 and towards the tool bit 460. The protrusion of the blades 180 act as a safety barrier if the rotating tool bit 460 or work piece is forced too aggressively onto the article or specimen 760 to be machined. In such instances, the blades 180 cut into the article or specimen 760 first rather than having the whole spindle 740 forcibly stopped from its high speed rotation. In some embodiments, the blades 180 are beveled to further facilitate the blades 180 in cutting into the article or specimen 760, which is relatively cheaper and easier to replace than fixing a damaged machining system 700. As shown in FIG. 7, if tool bit 460 drills too deeply into specimen 760, the blades of fastening nut 200 will contact and cut into specimen 760 before any other part of the tool bit holding system 400.

In another aspect of the invention, rotation of the machining system spindle 740 creates a suction or vacuum proximate the point of contact between the tool bit 460 and the specimen 760 to be machined. In one embodiment, the spindle 740 of the machining system 700 rotates at a speed of 18,000+/−6000 RPM. The suction created while the machining system 700 is operational removes dust, debris, and other waste residues at the area of machining of the article or specimen. In one embodiment, the suction created directly at the site of machining relieves the small debris and dust that are generated to provide a much cleaner and efficient machining area.

In some embodiments, the machining system 700 increases the life of a tool bit 460 by eliminating extra friction and subsequent heat generation on the rotating tool bit 460 that are caused by dust and residue. In one embodiment, as shown in FIG. 7, the machining system 700 further includes a vacuum chamber or dust hood 770 to facilitate removal of dust and waste residue in the air and area surrounding the machining system 700. Suction created by the machining system 700 may blow the small debris and dust from the machining area into the air and surrounding area. The vacuum chamber or dust hood 770 removes the blown debris and dust and provides a cleaner working environment that is healthier for operators and reduces build-up of residues on critical components of the machining system 700.

Method of Cutting a Specimen

Figure 8:
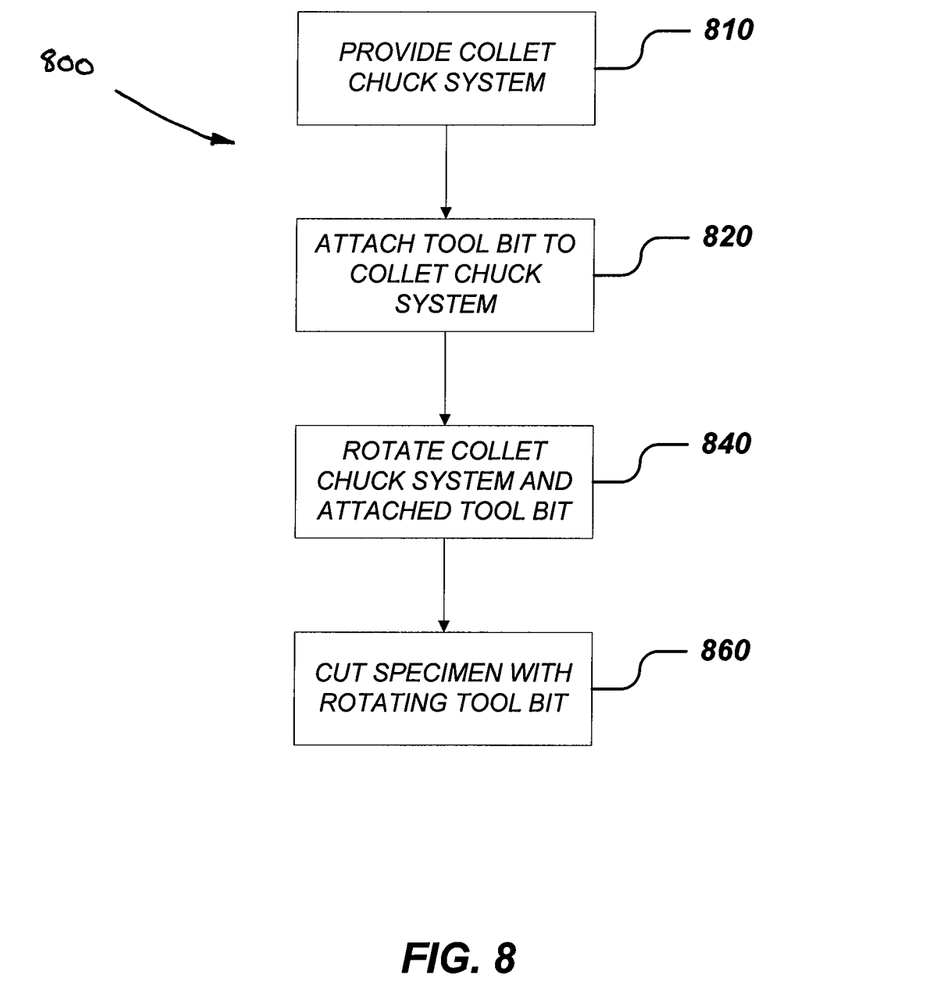
FIG. 8 is a chart illustrating an embodiment of a method for cutting a specimen.

FIG. 8 is a diagram illustrating one embodiment of the method of cutting a specimen. In step 810 of method 800, the collet chuck system 400 described herein is provided. The collet chuck system 400 comprises a collet 440, a receiving body 420, and the fastening nut 100 described herein for fastening the receiving body 420 and the collet 440 together. The fastening nut 100 comprises a main body 110 having an outer surface 120, a first end 140, and a second end 160 distal to the first end 140. The fastening nut 100 further comprises a plurality of blades 180 located radially on the outer surface 120 of the main body 110, wherein each blade 180 is at an angle to the second end 160.

In step 820, a tool bit 460 is attached to the collet chuck system 400. The tool bit 460 is attached to the collet chuck system 400 by clamping the tool bit 460 in the collet 440 and axially retaining the collet 440 between the fastening nut 100 and receiving body 420.

In step 840, the collet chuck system 400 and attached tool bit 460 are rotated. In step 860, the specimen 760 is cut with the rotating tool bit 460 while debris created from cutting the specimen 760 is removed with a suction created by the rotation of the fastening nut 100.

Though the present disclosure mainly describes usage of the fastening nut in conjunction with a tool bit during a machining process, the fastening nut may also be used when there is no tool bit. Rotating the fastening nut without a tool bit attached can also be used for purely suctioning/vacuuming of dust and debris from an article or specimen. It can also be contemplated that counter rotation of the fastening nut (e.g. counter-clockwise rotation instead of clockwise rotation) can be used to create air blowing/ejection instead of suction. This may also be used to remove dust and debris from an article or specimen.

Furthermore, though a fastening nut with dust and debris removal capabilities and/or safety mechanisms is described in the present disclosure, a separate unit with the same functionalities may also be implemented in conjugation with standard fastening nuts, tool bit holding systems, and machining systems.

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A fastening nut for fastening a receiving body and a collet together, the fastening nut comprising:

a main body having an outer surface, a first end, and a second end distal to the first end; and a plurality of blades located radially on the outer surface of the main body, wherein each blade is at an angle to the second end;

wherein the fastening nut is attachable on the receiving body for coaxial retention of the collet and wherein axial rotation of the fastening nut creates a suction proximate the second end of the fastening nut;

wherein the plurality of blades protrude axially past the second end of the main body in a direction away from the first end; and wherein each blade has a beveled edge, wherein the beveled edge contacts a specimen to be cut before the second end contacts the specimen.

2. The fastening nut of claim 1, wherein the plurality of blades are angled at a 45 degree angle to the second end.

3. The fastening nut of claim 1, wherein the main body is a cylindrical body and the outer surface is an outer circumferential surface.

4. The fastening nut of claim 3, comprising six blades of angularly equidistant spacing on the outer circumferential surface of the main body.

5. A tool bit holding system comprising:
a collet with a longitudinal cavity for engaging with a tool bit;
a receiving body having a recess for receiving the collet; and
a fastening nut for fastening the receiving body and the collet together, the fastening nut comprising:
a main body having an outer surface, a first end, and a second end distal to the first end; and
a plurality of blades located radially on the outer surface of the main body, wherein each blade is at an angle to the second end;
wherein the fastening nut is removably attached on the receiving body and coaxially retains the collet within the recess of the receiving body, and wherein axial rotation of the tool bit holding system creates a suction proximate the second end of the fastening nut;
wherein the plurality of blades protrude axially past the second end of the main body of the fastening nut in a direction away from the first end; and
wherein each blade has a beveled edge, wherein the beveled edge contacts a specimen to be cut before the second end contacts the specimen.

6. The system of claim 5, wherein the plurality of blades are angled at a 45 degree angle to the second end.

7. The system of claim 5, wherein the main body is a cylindrical body and the outer surface is an outer circumferential surface.

8. The system of claim 7, comprising six blades of angularly equidistant spacing on the outer circumferential surface of the main body.

9. The system of claim 7, wherein the receiving body includes a threaded outer circumference and the cylindrical body of the fastening nut has a hollow threaded inner surface for engagement with the threaded outer circumference of the receiving body.

10. A method of cutting a specimen, the method comprising:
providing a collet chuck system, wherein the collet chuck system comprises:
a collet with a longitudinal cavity for engaging with a tool bit;
a receiving body having a recess for receiving the collet; and
a fastening nut for fastening the receiving body and the collet together, the fastening nut comprising:
a main body having an outer surface, a first end, and a second end distal to the first end; and
a plurality of blades located radially on the outer surface of the main body, wherein each blade is at an angle to the second end;
attaching a tool bit to the collet chuck system by clamping the tool bit in the longitudinal cavity of the collet and axially retaining the collet between the fastening nut and receiving body;
rotating the collet chuck system and attached tool bit; and
cutting the specimen with the rotating tool bit while removing debris created from cutting the specimen with a suction created by the rotation of the fastening nut;
wherein the plurality of blades protrude axially past the second end of the main body in a direction away from the first end; and
wherein each blade has a beveled edge, wherein the beveled edge contacts a specimen to be cut before the second end contacts the specimen.

11. The method of claim 10, wherein the plurality of blades are angled at a 45 degree angle to the second end.

12. The method of claim 10, wherein the main body is a cylindrical body and the outer surface is an outer circumferential surface.

13. The system of claim 12, comprising six blades of angularly equidistant spacing on the outer circumferential surface of the main body.

14. A fastening nut for fastening a receiving body and a collet together, the fastening nut comprising:
a cylindrical body having an outer circumferential surface, a first end, and a second end distal to the first end; and
a plurality of blades located radially on the outer circumferential surface of the cylindrical body, wherein each blade has a beveled edge and is at a 45 degree angle to the second end and wherein the plurality of blades protrude axially past the second end of the cylindrical body in a direction away from the first end such that the beveled edge contacts a specimen to be cut before the second end contacts the specimen;
wherein the fastening nut is removably attachable on the receiving body for coaxial retention of the collet and wherein axial rotation of the fastening nut creates a suction proximate the second end of the fastening nut.

* * * * *